E. M. FOSTER.
DEMOUNTABLE RIM AND MEANS FOR FASTENING SAME.
APPLICATION FILED JULY 15, 1918.
1,379,809.
Patented May 31, 1921.
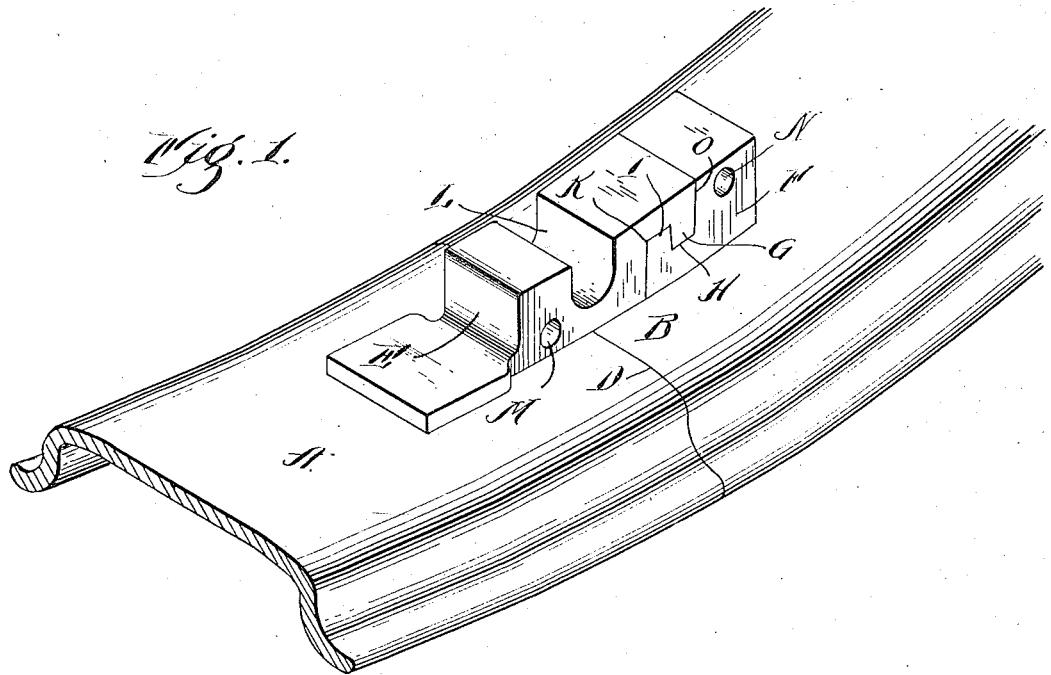
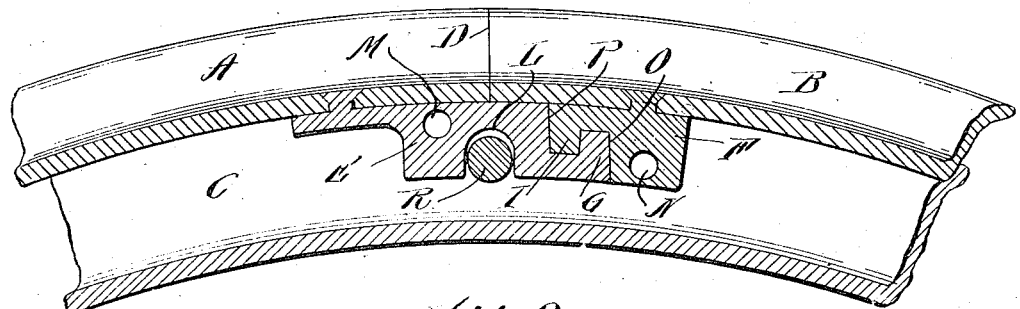
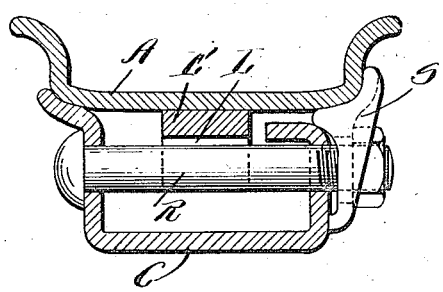

UNITED STATES PATENT OFFICE.

EMORY M. FOSTER, OF CLEVELAND, OHIO, ASSIGNOR TO THE HYDRAULIC PRESSED STEEL COMPANY, OF CLEVELAND, OHIO, A CORPORATION OF OHIO.

DEMOUNTABLE RIM AND MEANS FOR FASTENING SAME.

1,379,809.     Specification of Letters Patent.     Patented May 31, 1921.

Application filed July 15, 1918. Serial No. 244,952.

*To all whom it may concern:*

Be it known that I, EMORY M. FOSTER, a citizen of the United States, residing at Cleveland, in the county of Cuyahoga and State of Ohio, have invented a certain new and useful Improvement in Demountable Rims and Means for Fastening Same, of which the following is a full, clear, and exact description, reference being had to the accompanying drawings.

This invention relates generally to demountable tire carrying rims, and more particularly to a one piece transplit rim preferably used in connection with a channeled sheet metal fixed rim, although the invention can be used in connection with a wheel body provided with the usual wooden felly and metal band thereon.

The object of the invention is to provide a novel form of device for opening and closing a transplit rim to facilitate the placing or removal of the tire, and the invention also has for its object to utilize the rim opening and closing means as a driving lug or connection between the rim and wheel body, and it is also an object of the invention to construct the rim opening and closing means in such a manner that when the rim is closed the ends thereof will be locked against circumferential movement or separation.

With these various objects in view the invention consists in the novel features of construction hereinafter fully described and set forth in the appended claims.

In the drawings forming a part of this specification Figure 1 is a detail perspective view showing a portion of a tire carrying rim provided with my improvement. Fig. 2 is a sectional elevation of a portion of a tire carrying rim and fixed rim, the rim operating and fastening means being shown in elevation and Fig. 3 is a transverse sectional view of the line 3—3 of Fig. 2.

Referring to the drawing, A indicates one end of the tire carrying rim, and B the opposite end of said rim.

C indicates the sheet metal fixed rim.

The tire carrying rim is divided upon a straight line as indicated at D. To the end A is attached a member E, said member being attached to the inner face of the base of the rim about midway between the side edges thereof; this member being in the form of a block or lug and constructed in any suitable manner. It is attached by rivets or welding and projects a considerable distance beyond the end A as shown.

A member F is attached to the other end B of the rim, this member F being arranged centrally upon the inner face of the base of the rim and also attached by riveting or welding and it will be noted that this member F is set back a slight distance from the extreme end of the portion B.

The members E and F overlap and interlock to prevent the circumferential separation of the rim ends, and this interlocking is accomplished by forming the member E with a transverse hook-like portion G which fits into a transverse groove portion H, produced in the member F; and the member F is also formed with a hook portion I which is adapted to enter a grooved portion K in the member F.

These interlocking features are all located upon one and the same side of the dividing line D.

The member E is also formed with a transverse groove L which it will be noted is in line with the dividing line D.

The member E has a transverse bore or opening M and the member F has a transverse bore or opening N, the opening N being placed nearer to the center of the rim than the transverse bore or opening M and these openings M and N are intended to receive the laterally projecting studs of a rim operating tool which constitutes the subject matter of a separate application filed of even date herewith.

The face O of the hook G is inclined about 5° and the meeting face of the member F is correspondingly inclined, and the face P of the hook I is also inclined about 5° and the meeting face of the member E is correspondingly inclined.

These inclinations are found desirable in order to permit the interlocking portions to readily engage and disengage when the rim is moved into closed and opened positions by means of the aforesaid operating tool.

It is obvious that when the members are in locked position such as shown in Figs. 1 and 2 it will be impossible to accidentally separate the rim ends, no matter what radial strain may be placed upon the rim.

In use, the rim with the members E and F rigidly connected thereto are placed upon the channeled fixed rim C and the tire carrying rim will be so positioned that one of the fastening bolts R which passes through the channeled fixed rim will rest within the transverse groove L, and consequently the member E will in reality constitute a driving lug or driving connection between the rim and wheel body through the medium of the bolt R, and inasmuch as the rim ends A and B are securely locked together through the medium of the members E and F it is obvious that a driving connection between the rim as a whole and the wheel body will be obtained.

It is customary to employ a clamp S upon the bolt R for the purpose of fastening the demountable rim upon the fixed rim and it will be noted that inasmuch as the bolt R is in line with the split of the rim, the clamp S which is secured thereon by means of the nut T, will bear upon both ends of the rim and consequently will hold said ends in their proper lateral positions upon the fixed rim.

It will thus be seen that I provide a very simple and highly efficient means for connecting the ends of a transplit rim, which means can be utilized to open and close the rim and also serve as a driving connection between the rim and wheel body.

Having thus described my invention, what I claim is:—

1. The combination with a transplit tire carrying rim, of a member connected to one end of rim extending longitudinally beyond said end, a second member, connected to the other end of the rim a short distance from said end, said members having interlocking hook and groove portions.

2. The combination with a fixed rim, of a transplit tire carrying rim adapted to be arranged thereon, said tire carrying rim having interlocking members connected to the ends of said rim, a bolt passing through the fixed rim, one of said members connected to the tire carrying rim having a transverse opening adapted to receive said bolt.

3. The combination with a fixed rim, of a transplit tire carrying rim arranged thereon, a bolt passing through the fixed rim, a member connected to one end of the tire carrying rim, a second member connected to the other end of said rim, said members being adapted to interlock, one of said members having a transverse opening adapted to receive the bolt passing through the fixed rim.

4. The combination with a transplit tire-carrying rim, of a member connected to one end of said rim, a second member connected to the other end of said rim, said members having transverse interlocking portions, one of said members having a transverse opening in line with the split of said rim, both of said members having transverse bores, the transverse bore of one being nearer to the center of the rim than the other.

5. The combination with a channeled fixed rim, of a transplit tire carrying rim adapted to seat thereon, a member connected to one end of said rim, a second member connected to the other end of said rim, said members having transverse interlocking portions adapted when engaged to hold the rim ends against separation, one of said members having a transverse opening in line with the split of the rim, a bolt passed through the fixed rim and resting within said transverse opening in said member, and a clamp fastened upon said bolt and adapted to engage the rim upon opposite sides of the split.

In testimony whereof, I hereunto affix my signature.

EMORY M. FOSTER.